US010001697B2

(12) United States Patent
Seki

(10) Patent No.: US 10,001,697 B2
(45) Date of Patent: Jun. 19, 2018

(54) IMAGE CAPTURE APPARATUS, ACCESSORY, METHOD FOR CONTROLLING THEM, AND IMAGE CAPTURE SYSTEM

(71) Applicant: CANON KABUSHIKI KAISHA, Tokyo (JP)

(72) Inventor: Hironori Seki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 80 days.

(21) Appl. No.: 15/428,358

(22) Filed: Feb. 9, 2017

(65) Prior Publication Data
US 2017/0235214 A1    Aug. 17, 2017

(30) Foreign Application Priority Data
Feb. 16, 2016 (JP) ................. 2016-027245

(51) Int. Cl.
*G03B 17/56* (2006.01)
*G03B 17/14* (2006.01)
*H04N 5/232* (2006.01)

(52) U.S. Cl.
CPC .......... *G03B 17/565* (2013.01); *G03B 17/14* (2013.01); *H04N 5/23296* (2013.01); *G03B 2206/00* (2013.01)

(58) Field of Classification Search
None
See application file for complete search history.

(56) References Cited

U.S. PATENT DOCUMENTS

| 2005/0237417 | A1* | 10/2005 | Miyasaka | G02B 7/34 348/335 |
| 2012/0033955 | A1* | 2/2012 | Okada | G02B 7/14 396/71 |
| 2013/0028590 | A1* | 1/2013 | Hasuda | G03B 17/14 396/530 |
| 2017/0180638 | A1* | 6/2017 | Saito | H04N 5/23225 |

FOREIGN PATENT DOCUMENTS

JP    2011-197094 A    10/2011

* cited by examiner

*Primary Examiner* — Clayton E Laballe
*Assistant Examiner* — Linda B Smith
(74) *Attorney, Agent, or Firm* — Cowan, Liebowitz & Latman, P.C.

(57) ABSTRACT

An image capture apparatus that makes it possible to properly update a second accessory that is attached to a first accessory attached to the image capture apparatus, and a method for controlling the image capture apparatus, are disclosed. An update target accessory, out of the attached first accessory and the second accessory attached to the first accessory, is set based on the operation status of the first accessory and the operation status of the second accessory. If it is determined that the operation status of the first accessory is abnormal, the first accessory is set as the update target accessory, regardless of the operation status of the second accessory.

20 Claims, 9 Drawing Sheets

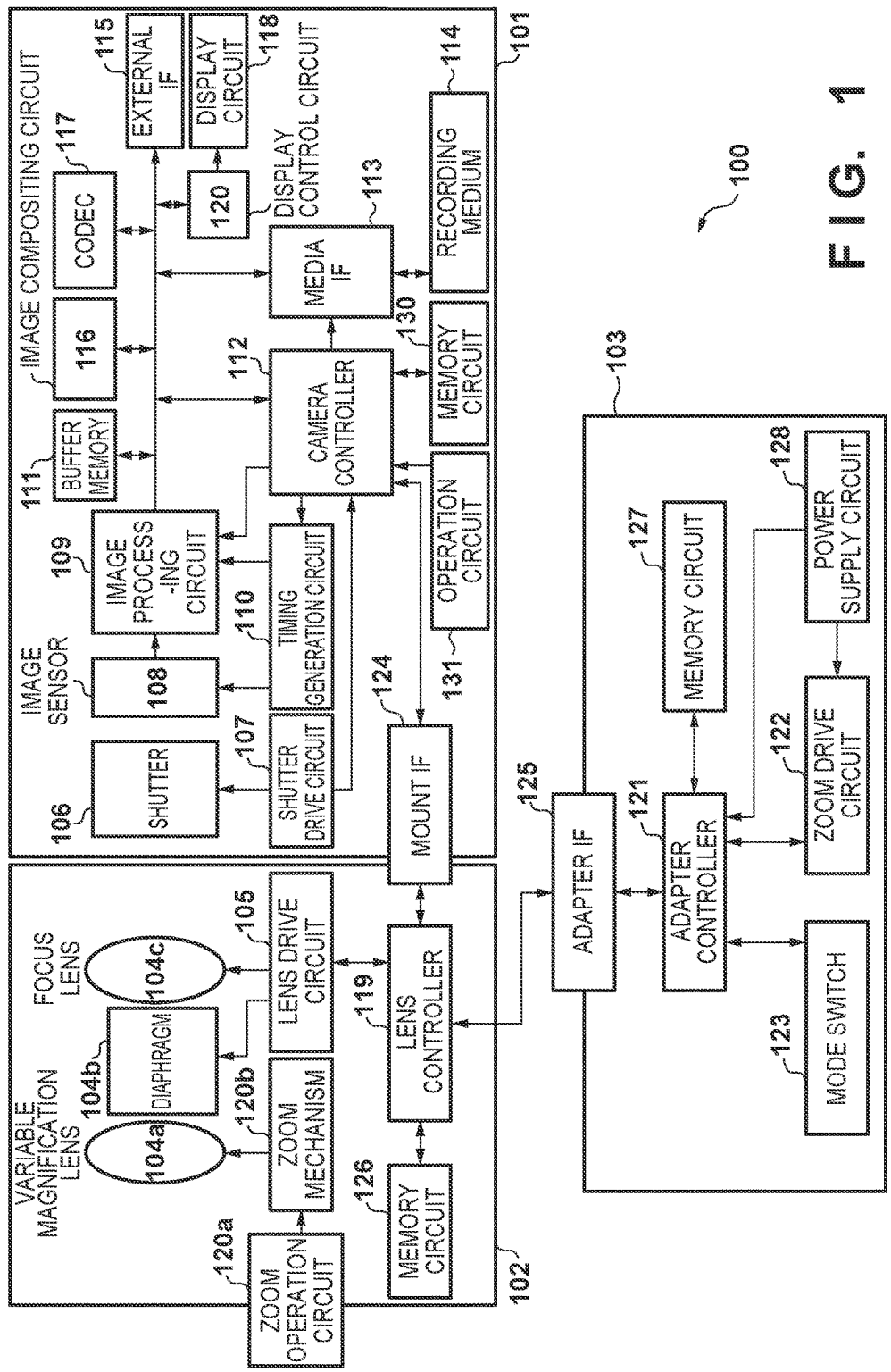

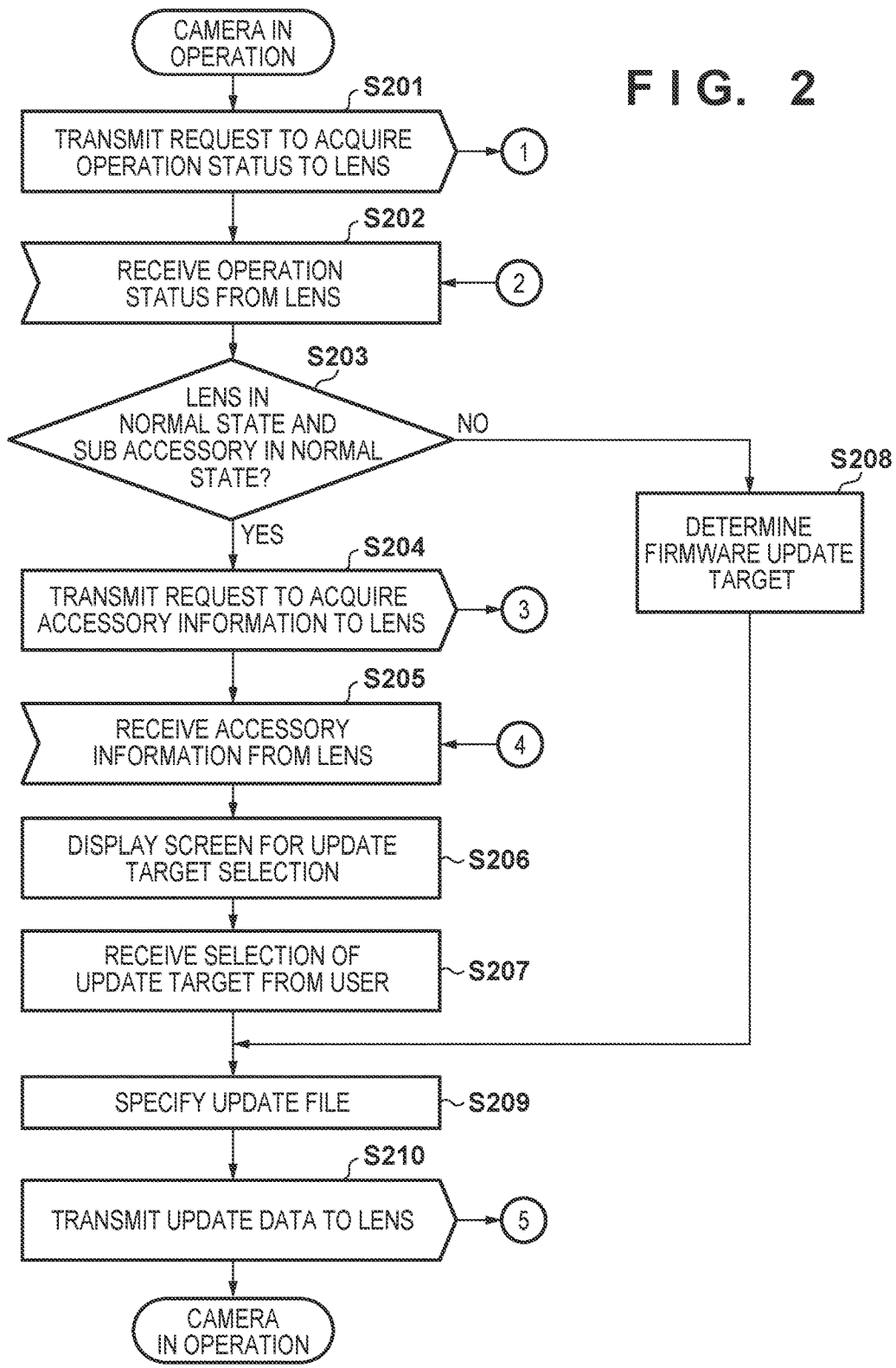

THE FIRMWARE OF THE LENS IS IN AN ABNORMAL STATE

A LENS WHOSE FIRMWARE HAS
NOT BEEN PROPERLY UPDATED IS ATTACHED.
PLEASE UPDATE THE FIRMWARE OF THE LENS,
OR ATTACH A NORMAL LENS.

THE FIRMWARE OF THE POWER ZOOM ADAPTER
IS IN AN ABNORMAL STATE

A POWER ZOOM ADAPTER WHOSE FIRMWARE
HAS NOT BEEN PROPERLY UPDATED IS ATTACHED.
PLEASE UPDATE THE FIRMWARE OF
THE POWER ZOOM ADAPTER,
OR ATTACH A NORMAL POWER ZOOM ADAPTER.

| ACCESSORY | ATTACHMENT STATUS | VERSION |
|---|---|---|
| POWER ZOOM ADAPTER | ATTACHED | Ver.1.0.2 |
| ACCESSORY 1 | ATTACHED | Ver.2.0.0 |
| ACCESSORY 2 | NOT ATTACHED | — |

FIG. 6B

| FIRMWARE UPDATE | |
|---|---|
| PLEASE SELECT UPDATE TARGET | |
| CAMERA | Ver.1.2.1 |
| LENS | Ver.1.0.0 |
| POWER ZOOM ADAPTER | Ver.1.0.2 |
| ACCESSORY 1 | Ver.2.0.0 |
| | |

IMAGE CAPTURE APPARATUS, ACCESSORY, METHOD FOR CONTROLLING THEM, AND IMAGE CAPTURE SYSTEM

BACKGROUND OF THE INVENTION

Field of the Invention

The present invention relates to an image capture apparatus, an accessory, a method for controlling them, and an image capture system.

Description of the Related Art

There is a conventional lens-interchangeable image capture apparatus capable of updating control software (firmware) stored in an attached lens unit. Also, Japanese Patent Laid-Open No. 2011-197094 discloses a configuration in which the firmware of an extender attached between a lens unit and an image capture apparatus is updated from the image capture apparatus.

SUMMARY OF THE INVENTION

One aspect of the present invention provides an image capture apparatus and a control method thereof that make it possible to properly update a second accessory that is attached to a first accessory attached to the image capture apparatus.

According to an aspect of the present invention, there is provided an image capture apparatus comprising: a receiving unit configured to receive information regarding a first accessory attached to the image capture apparatus and a second accessory attached to the first accessory, from the first accessory; a setting unit configured to set an update target accessory whose control software is to be updated, out of the first accessory and the second accessory, based on the information received by the receiving unit; and a transmitting unit configured to transmit update data that is to be applied to the update target accessory that has been set by the setting unit, to the first accessory, wherein the setting unit sets the first accessory as the update target accessory if the information received by the receiving unit indicates that an update of control software of the first accessory is in an interrupted state, regardless of whether or not an update of control software of the second accessory is in an interrupted state.

According to another aspect of the present invention, there is provided an accessory for an image capture apparatus, comprising: a first communication unit configured to transmit an instruction that requests information regarding a sub accessory attached to the accessory, to the sub accessory, and to receive the information; a second communication unit configured to transmit information regarding the accessory and the information regarding the sub accessory to an image capture apparatus to which the accessory is attached, in response to an instruction received from the image capture apparatus and requesting information, and to receive update data that is to be applied to an update target accessory whose control software is to be updated, out of the accessory and the sub accessory, from the image capture apparatus; a storage unit configured to store control software of the accessory; and a control unit configured to, if an update of the control software of the accessory is in an interrupted state, transmit information indicating that the update of the control software of the accessory is in an interrupted state to the image capture apparatus, and receive update data from the image capture apparatus, by using the second communication unit, and update the control software stored in the storage unit, and receive information indicating whether or not an update of control software of the sub accessory is in an interrupted state, from the sub accessory, by using the first communication unit, and transmit the received information to the image capture apparatus by using the second communication unit.

According to a further aspect of the present invention, there is provided an accessory for an image capture apparatus, comprising: a first receiving unit configured to receive information regarding a sub accessory attached to the accessory; a storage unit configured to store control software of the accessory; a determining unit configured to determine an update target accessory whose control software is to be updated, out of the accessory and the sub accessory; a transmitting unit configured to transmit a notification indicating information regarding the update target accessory, to the image capture apparatus to which the accessory is attached; and a second receiving unit configured to receive update data that is to be applied to the update target accessory, from the image capture apparatus, wherein the determining unit determines, if an update of the control software stored in the storage unit is in an interrupted state, the accessory as the update target accessory, regardless of whether or not an update of control software of the sub accessory is in an interrupted state.

According to another aspect of the present invention, there is provided an image capture system that includes an image capture apparatus, a first accessory attached to the image capture apparatus, and a second accessory attached to the image capture apparatus, the first accessory comprising: a first receiving unit configured to receive information regarding the second accessory; a first transmitting unit configured to transmit information regarding the first accessory and the second accessory to the image capture apparatus; and a second receiving unit configured to receive update data that is to be applied to an update target accessory whose control software is to be updated, out of the first accessory and the second accessory, from the image capture apparatus, the image capture apparatus comprising: a third receiving unit configured to receive information regarding the first accessory and the second accessory from the first accessory; a second transmitting unit configured to transmit the update data that is to be applied to the update target accessory, to the first accessory; and a setting unit configured to set the first accessory as the update target accessory upon the third receiving unit receiving information indicating that an update of control software of the first accessory is in an interrupted state, regardless of whether or not update of control software of the second accessory is in an interrupted state.

According to a further aspect of the present invention, there is provided a method for controlling an image capture apparatus to which a first accessory is attached, wherein a second accessory is attached to the first accessory, the method comprising: receiving information regarding the first accessory; setting an update target accessory whose control software is to be updated, based on the information received in the receiving; transmitting update data that is to be applied to the update target accessory that has been set, to the first accessory, wherein, in the setting, the first accessory is set as the update target accessory if information indicating that an update of control software of the first accessory is in an interrupted state is received in the receiving, regardless of whether or not update of control software of the second accessory is in an interrupted state.

According to another aspect of the present invention, there is provided a method for controlling an accessory for an image capture apparatus, comprising: receiving information regarding a sub accessory attached to the accessory; transmitting information regarding the accessory to an image capture apparatus to which the accessory is attached; and receiving update data that is to be applied to an update target accessory whose control software is to be updated, out of the accessory and the sub accessory, from the image capture apparatus, determining the accessory as the update target accessory if, in the transmitting, information indicating that an update of control software of the accessory is in an interrupted state is transmitted, regardless of whether or not an update of control software of the sub accessory is in an interrupted state.

Further features of the present invention will become apparent from the following description of exemplary embodiments with reference to the attached drawings.

BRIEF DESCRIPTION OF THE DRAWINGS

FIG. 1 is a block diagram showing an example of a configuration of an image capture system according to a first embodiment of the present invention.

FIG. 2 is a flowchart of an operation of a digital camera according to the first embodiment.

FIGS. 5A and 5B are diagrams showing examples of screens displayed by the digital camera according to the first embodiment.

FIGS. 6A and 6B are diagrams showing an example of accessory attachment information and an example of a selection screen according to the first embodiment.

DESCRIPTION OF THE EMBODIMENTS

Figure 3A:
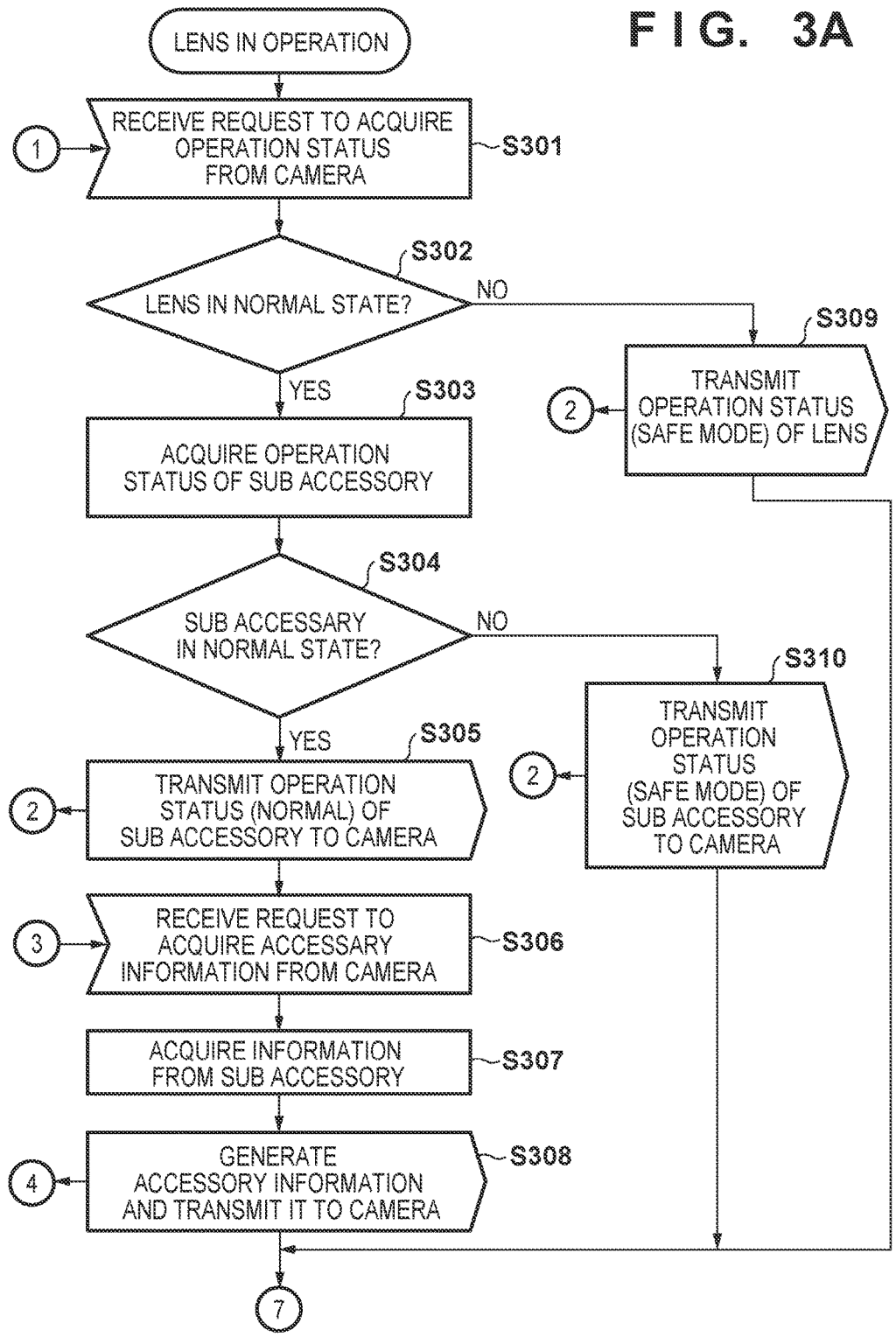
FIGS. 3A and 3B are flowcharts of an operation of a lens unit according to the first embodiment.

The inventors of the present invention have found a problem in which, if the firmware of a lens unit attached to a front part of an extender is updated when, for example, the extender is in an abnormal state, there is the risk of the firmware of the lens unit not being properly updated and becoming inoperable. However, Japanese Patent Laid-Open No. 2011-197094 does not disclose such a problem per se, let alone a means for solving the problem. Considering the problem above, the following embodiments describe an image capture apparatus that makes it possible to properly update a second accessory that is attached to a first accessory attached to the image capture apparatus, and a method for controlling the image capture apparatus.

Exemplary embodiments of the present invention will now be described in detail in accordance with the accompanying drawings. Note that in the embodiments described below, a device that is to be attached to the camera body, such as an interchangeable lens (a lens unit), an extender, or a flash, is referred to as an accessory or a first accessory, and a device that is attachable to and detachable from the (first) accessory is referred to as a sub accessory or a second accessory. Therefore, when an extender is attached to the camera body, an interchangeable lens is a second accessory. Note that the first accessory and the second accessory may simply be referred to as "the accessory" when there is no need to distinguish them from each other. The following describes a configuration in which an interchangeable lens that has a zoom function is used as an example of the accessory, and a zoom adapter that mechanically drives a zoom mechanism of the lens from the outside of the lens is used as an example of the sub accessory. However, the present invention is applicable to other combinations of an accessory and a sub accessory.

FIRST EMBODIMENT

FIG. 1 is a block diagram showing a connection relationship among devices that constitute an image capture system according to an embodiment of the present invention, and an example of a functional configuration of each device. An image capture system 100 according to the present embodiment includes an interchangeable lens digital camera (a camera body) 101, a lens unit (an interchangeable lens or an imaging lens) 102 that is attachable to and detachable from the digital camera 101, and a zoom adapter 103 that is attachable to and detachable from the lens unit 102.

The digital camera (hereinafter referred to as "the camera") 101 and the lens unit (hereinafter referred to as "the lens") 102 can bidirectionally communicate via a mount IF (a first communication circuit) 124 that is provided in a lens mount. The mount IF 124 is also used to provide electrical power from the camera 101 to the lens 102. The lens 102 and the zoom adapter 103 can bidirectionally communicate via an adapter IF (a second communication circuit) 125.

The lens 102 is an imaging lens that forms an optical image of a subject on an imaging surface of an image sensor 108 included in the camera 101. In the present embodiment, the lens 102 is a zoom lens that includes a variable magnification lens 104a. A zoom operation circuit 120a that is provided on a housing of the lens 102 is a movable member that is operated by a user when the user changes the focal length and the magnification of the lens 102. A typical example of the zoom operation circuit 120a is a zoom ring. A zoom mechanism 120b moves the variable magnification lens 104a along the optical axis as the zoom operation circuit 120a moves.

It is assumed that the present embodiment employs a configuration in which the zoom operation circuit 120a and the zoom mechanism 120b mechanically engage with each other to drive the variable magnification lens 104a. However, it is also possible that the direction of operation and the amount of operation of the zoom operation circuit 120a are detected, and the variable magnification lens 104a is driven by controlling a motor or an actuator according to the direction of operation and the amount of operation. If this is the case, the direction of operation and the amount of operation of the zoom operation circuit 120a may be detected by a lens controller 119 described below so that the motor or the actuator can be controlled. Note that the position of the variable magnification lens 104a (or the magnification of the lens 102) can be detected by the lens controller 119.

The lens 102 also includes a diaphragm 104b and a focus lens 104c, which are movable components. The diaphragm 104b and the focus lens 104c are driven by a lens drive circuit 105 using a motor or an actuator based on the lens controller 119.

A memory circuit 126 is constituted by a rewritable non-volatile memory, and stores control software (firmware) that is to be executed by the lens controller 119, and characteristic information and status information regarding the lens 102. The characteristic information includes, for example, a model name (identification information), optical characteristics, and correction information. The status information indicates, for example, operation status (normal/safe mode), the positional information (or the magnification) of the variable magnification lens 104a, the positional information regarding the focus lens 104c, the F value of the diaphragm 104b, the version and the update status of the firmware, and whether or not the zoom adapter 103 is attached. However, note that these examples are non-limiting examples. The memory circuit 126 also stores a program that is executed when the lens 102 is to be operated in a safe mode described below.

The lens controller 119 includes a programmable processor such as a CPU, and realizes various operations such as the operation of the lens 102 described below by reading out and executing a program from the memory circuit 126. For example, the lens controller 119 executes an operation according to an instruction received from a camera controller 112 via the mount IF 124, such as an operation to control the lens drive circuit 105, or an operation to update the firmware stored in the memory circuit 126.

The lens controller 119 updates old firmware stored in the memory circuit 126 by overwriting the firmware with new firmware received from the camera 101 via the mount IF 124, for example. The lens controller 119 also manages update processing by recording, in the memory circuit 126, data that indicates the status of firmware update processing (update status data). For example, the lens controller 119 sets a value indicating "incomplete" to the update status data before overwriting the firmware, and sets a value indicating "complete" to the update status data upon completion of the overwriting of the firmware. Note that there may be different values indicating "complete", namely a value indicating "normal completion" and a value indicating "abnormal completion". Also, the value indicating "abnormal completion" may vary depending on the cause of the abnormality.

For example, if the lens 102 is detached from the camera 101 while the firmware is being updated, power supply to the lens 102 is disconnected, and therefore update processing is interrupted, leaving the value of the update status data that indicates "incomplete" unchanged. For example, the lens controller 119 checks the update status data upon the lens 102 being attached to the camera 101, and if the value of the update status data indicates an incomplete state, a transition to a mode in which operations are limited (a safe mode) occurs.

In the safe mode, only limited functions, which include processing that is necessary for updating the firmware, can be executed. Specifically, processing for transmitting information indicating that the mode is the safe mode (or a request to update the firmware) to the camera 101, and processing for updating the firmware in the memory circuit 126 by using firmware received from the camera 101, can be executed. Other kinds of processing, such as control of the lens drive circuit 105, cannot be executed.

Usually, the capacity of the memory circuit 126 is not so large as to be able to store a duplicate of the entire firmware. Accordingly, the capacity that can be used to store a program for the safe mode is limited. Therefore, in the safe mode, only limited functions, which include essential functions such as the function of transmitting the operation status of the lens 102 and the function of updating the firmware, are provided. In the safe mode, if the lens controller 119 receives, via the mount IF 124 and the adapter IF 125, a request to execute processing that cannot be executed in the safe mode, such as a request to update the firmware of the zoom adapter 103, the lens controller 119 ignores the request.

The camera controller 112 can detect that the lens 102 attached to the camera 101 is in the safe mode, based on the operation status of the lens 102 that has been acquired, for example. Upon detecting that the lens 102 is in the safe mode, the camera controller 112 can notify a user of the fact that a firmware update is necessary for normal operation of the lens 102, by, for example, displaying a message on a display circuit 118.

In the camera 101, a shutter drive circuit 107 operates to open and close a shutter 106 under the control of the camera controller 112. The image sensor 108 in which a plurality of pixels are arranged is exposed to light while the shutter 106 is open, and outputs a subject image formed by the lens 102, as an image signal that is constituted by electrical signals that have undergone conversion by each pixel.

An image processing circuit 109 applies various kinds of processing to the image signal output by the image sensor 108, to generate image data, control information, and so on. Examples of the processing that can be applied by the image processing circuit 109 to generate image data include A/D conversion processing, noise reduction processing, defective pixel correction processing, color conversion processing, color interpolation (demosaic) processing, white balance adjustment processing, gradation correction processing, distortion correction processing, and scaling processing. Also, the image processing circuit 109 generates data used for automatic focus detection (AF) and automatic exposure control (AE) as control information. Examples of control information include an evaluation value used for contrast AF, an image signal used for phase difference AF, brightness information, and information regarding the position and the size of the subject region. It is possible that the image processing circuit 109 executes processing other than the examples shown above, or does not execute one or more of the examples.

A timing generation circuit 110 outputs various kinds of timing signals and control signals to the image sensor 108 and the image processing circuit 109.

A memory circuit 130 is constituted by a rewritable non-volatile memory, and stores, for example, programs that are to be executed by the camera controller 112 (firmware and application software), GUI data, audio data, various kinds of initial values and setting values, and various kinds of information regarding the camera 101.

The camera controller 112 controls various kinds of arithmetic processing and the entire image capture apparatus.

A buffer memory 111 is a memory for temporarily storing image data and so on.

The camera controller 112 includes a programmable processor such as a CPU, and controls the operation of the entirety of the camera 101 and the operation of the lens 102 by reading out and executing a program from the memory circuit 130. For example, the camera controller 112 executes AF processing for controlling the position of the focus lens 104c and AE processing for controlling the operations of the diaphragm 104b and the shutter 106 by using control information generated by the image processing circuit 109. The camera controller 112 also executes processing corresponding to an instruction that is input from an operation circuit 131 (e.g. executes an interactive operation through a GUI).

As described above, the camera controller 112 also executes processing for updating the firmware of the lens 102 when the lens 102 is in the safe mode, or based on an instruction received through the operation circuit 131. Furthermore, as described below, the camera controller 112 also executes processing regarding a sub accessory that is attachable to the lens 102. Examples of this processing include processing for detecting whether or not a sub accessory is attached to the lens 102, processing for detecting the operation status of a sub accessory attached to the lens 102, and processing for controlling the operation of the sub accessory.

A media IF 113 is an interface for recording/reading out data to/from a recording medium 114 that is a detachable memory card.

The recording medium 114 is used as a recording destination of image data and audio data that have been acquired by image capturing performed by the camera 101, and is also used as a source of new firmware when the firmware of the camera 101, the lens 102, and the zoom adapter 103 is to be updated.

An external IF 115 is used for connecting an external device to the camera 101 wirelessly or via a wire.

An image compositing circuit 116 composites a plurality of pieces of image data that are temporarily stored in the buffer memory 111, for example when generating an HDR image.

A codec 117 encodes image data that is stored in the buffer memory 111, by using a predetermined method, and decodes encoded image data that has been read out from the recording medium 114 and stored in the buffer memory 111. The JPEG format and the MPEG format are typical encoding methods. However, other methods may be employed. The codec 117 stores encoded or decoded image data in the buffer memory 111, for example.

The display circuit 118 includes, for example, a liquid crystal display (LCD), and is used to display, for example, a GUI of the camera 101, a live view image, an image captured to be recorded, an image read out from the recording medium 114, and information regarding the camera 101, the lens 102, and the zoom adapter 103. The display circuit 118 is also used to: display a menu screen for allowing a user to input an instruction to update the firmware of the lens 102 and the zoom adapter 103; and notify the user of the occurrence of an error in the lens 102 and the zoom adapter 103 and the detection of an abnormal operation status. The display operation of the display circuit 118 is controlled by the camera controller 112 using a display control circuit 120.

The mount IF 124 is a bidirectional communication interface between the camera 101 (the camera controller 112) and the lens 102 (lens controller 119). It is possible to acquire the characteristic information and the status information regarding the lens 102 and control the diaphragm 104b and the focus lens 104c by transmitting an instruction or a request from the camera controller 112 to the lens controller 119 via the mount IF 124.

The camera controller 112 can also acquire, via the mount IF 124, information regarding a sub accessory (the zoom adapter 103 in this example) that can be attached to the lens 102.

The operation circuit 131 is a group of input devices used by a user to input a setting and an instruction to the camera 101. The operation circuit 131 includes operation members used to operate the GUI, such as a menu key, direction keys, and an enter key, and operation members used to perform an image capture operation, such as a release button, a mode dial, and a zoom button. If the display circuit 118 is a touch panel, the display circuit 118 is also included in the operation circuit 131. Note that the operation circuit 131 may include an input device that does not require a physical operation, such as an input device that uses speech recognition.

The zoom adapter 103 is a sub accessory for the lens 102, and is configured such that a movable part of a zoom drive circuit 122 is brought into contact with the zoom operation circuit 120a of the lens 102 under the condition where the zoom adapter 103 is attached to the lens 102. The movable part of the zoom drive circuit 122 is driven by a motor, an actuator, or the like, and mechanically drives the zoom operation circuit 120a that is in contact with the zoom drive circuit 122. Driving power for the zoom drive circuit 122 is supplied from a power supply circuit 128, which is, for example, a battery.

The adapter IF 125 is a communication interface between the zoom adapter 103 (an adapter controller 121) and the lens 102 (the lens controller 119). Using the adapter IF 125, the lens 102 can detect attachment and detachment of the zoom adapter 103, and acquire the status information (e.g. the version of the firmware, the update status, and the operation status) of the zoom adapter 103. The lens 102 can also forward a control instruction for the zoom adapter 103 received from the camera 101, to the zoom adapter 103 via the adapter IF 125.

A memory circuit 127 is constituted by a rewritable non-volatile memory, and stores a control program (a firmware) that is to be executed by the adapter controller 121, and the characteristic information and the status information regarding the zoom adapter 103. The characteristic information is, for example, a model name (identification information). The status information is, for example, the positional information regarding the zoom drive circuit 122, the version and the update status of the firmware, the operation status of the zoom adapter 103 (normal/safe mode), the status of a mode switch 123, and the status (the remaining charge) of the power supply circuit 128. However, note that these examples are non-limiting examples. The memory circuit 127 also stores a program that is executed when the zoom adapter 103 is to be operated in the safe mode.

The adapter controller 121 includes a programmable processor such as a CPU, and realizes various operations such as the operation of the zoom adapter 103 described below by reading out and executing a program from the memory circuit 127. For example, the adapter controller 121 executes an operation according to an instruction received from the lens controller 119 via the adapter IF 125, such as control of the zoom drive circuit 122, and the update of the firmware stored in the memory circuit 127.

The adapter controller 121 updates old firmware stored in the memory circuit 127 by overwriting the firmware with new firmware received from the lens 102 via the adapter IF 125. The adapter controller 121 also manages update processing by recording, in the memory circuit 127, data that indicates the status of firmware update processing (update status data). For example, the adapter controller 121 sets a value indicating "incomplete" to the update status data before overwriting the firmware, and sets a value indicating "complete" to the update status data upon completion of the overwriting of the firmware. Note that there may be different values indicating "complete", namely a value indicating "normal completion" and a value indicating "abnormal completion". Also, the value indicating "abnormal completion" may vary depending on the cause of the abnormality.

For example, if the zoom adapter 103 is detached from the lens 102 or the lens 102 is detached from the camera 101 while the reception of new firmware and the update of old firmware are performed in parallel, update processing is interrupted, leaving the value of the update status data that indicates "incomplete" unchanged. For example, the adapter controller 121 checks the update status data upon the zoom adapter 103 being attached to the lens 102, and if the value of the update status data indicates an incomplete state, a transition to a mode in which operations are limited (a safe mode) occurs.

In the safe mode, only limited functions, which include processing that is necessary for updating the firmware, can be executed. Specifically, processing for transmitting the operation status of the adaptor (or a request to update the firmware) to the lens 102, and processing for updating the firmware in the memory circuit 127 by using firmware received via the lens 102, can be executed. Other kinds of processing, such as control of the zoom drive circuit 122, cannot be executed. This is because only a limited amount of capacity is available for storing a program for the safe mode, as with the case of the memory circuit 126 of the lens 102. In the safe mode, if the adapter controller 121 receives, via the adapter IF 125, a request to execute processing that cannot be executed in the safe mode, such as a zoom control request, the adapter controller 121 ignores the request.

The mode switch 123 is a switch that allows a user to select a mode in which a zoom operation of the lens 102 is manually performed (by operating the zoom operation circuit 120a) or a mode in which the zoom operation is automatically performed (power zoom using the zoom adapter 103). If manual operation is selected, the adapter controller 121 does not drive the zoom drive circuit 122 despite receiving an instruction to drive the zoom adapter 103.

The camera 101 and the lens 102 perform bidirectional communication via the mount IF 124. For example, the camera 101 transmits an instruction regarding focus control to the lens 102. The lens 102 can transmit, to the camera 101, information that is characteristic of the lens 102, such as the maximum zoom position and the minimum zoom position, and information regarding the status of the lens, such as the current focus lens position and the zoom position.

The lens 102 and the zoom adapter 103 perform bidirectional communication via the adapter IF 125. For example, the lens 102 notifies the zoom adapter 103 of zoom position information (the current zoom position, the maximum zoom position, and the minimum zoom position). The zoom adapter 103 can determine whether or not a zoom operation is available based on the zoom position information thus notified. The zoom adapter 103 can also transmit information regarding the status of the zoom adapter 103 to the lens 102.

In the present embodiment, the camera 101 and the zoom adapter 103, despite not being connected to each other, can perform bidirectional communication via the lens 102. For example, the lens 102 (the lens controller 119) forwards, or provides a notification of, information received from the zoom adapter 103 (the adapter controller 121) to the camera 101 (camera controller 112), and thus bidirectional communication between the zoom adapter 103 and the camera 101 can be realized. Also, the lens 102 forwards, or provides a notification of, information received from the camera 101 to the zoom adapter 103, and thus it is possible to transmit information from the camera 101 to the zoom adapter 103. For example, by transmitting a zoom drive instruction that can be interpreted by the zoom adapter 103 from the camera 101 to the lens 102, it is possible to control the operation of the zoom adapter 103 and cause the lens 102 to zoom.

Note that an instruction to drive the zoom adapter 103 (a zoom control instruction) is not necessarily generated in response to an operation input to the camera 101 (operation circuit 131), and may be received by the camera 101 from an external device via the external IF 115. For example, the zoom control instruction may be transmitted from an external device that can communicate with the camera 101 (e.g. a mobile telephone or a tablet terminal) in response to a user operation input to an application for remote image capturing that operates in the external device. This zoom control instruction is forwarded by the camera 101 to the lens 102, and is further forwarded by the lens 102 to the zoom adapter 103. Thus, it is possible to remotely operate the zoom adapter 103 from the external device due to the camera 101 and the lens 102 relaying the instruction to control the zoom adapter 103, transmitted by the external device. Therefore, even if the lens 102 is in the manual zoom mode, it is possible to perform remote lens zoom control from the external device.

In this way, the lens 102 (the lens controller 119) relays or forwards data, and thus bidirectional communication between the camera 101 and the zoom adapter 103 can be realized. Note that the lens controller 119 can determine whether data received from the camera 101 or the zoom adapter 103 is addressed to the lens 102 or is required to be forwarded to another device by, for example, referring to header information.

The lens controller 119 receives the result of execution of the zoom drive instruction and information regarding the status of the zoom adapter 103 from the adapter controller 121 via the adapter IF 125, and forwards them to the camera controller 112 via the mount IF 124.

The camera controller 112 transmits an information request instruction to the lens controller 119 via the mount IF 124 upon detecting the attachment of the lens 102 via the mount IF 124. In response to this instruction, the lens controller 119 reads out the characteristic information and the status information from the memory circuit 126, and transmits them to the camera controller 112. Note that upon a sub accessory (the zoom adapter 103 in this example) being attached, the lens controller 119 may transmit an information request instruction to a control part of the sub accessory to acquire the characteristic information and the status information regarding the sub accessory, and store the information in the memory circuit 126. If this is the case, if the sub accessory is detached or the operation status of the sub accessory changes, the lens controller 119 applies such changes to the characteristic information and the status information regarding the sub accessory stored in the memory circuit 126. Also, upon receiving the information request instruction from the camera controller 112, the lens controller 119 reads out information regarding the sub accessory from the memory circuit 126 as well as information regarding the lens 102, and transmits the information to the camera controller 112. In the case where information regarding the sub accessory is not stored in the memory circuit 126, the lens controller 119 may forward the information request instruction to the adapter controller 121 upon receiving the information request instruction, and store, in the memory circuit 126, the characteristic information and the status information regarding the sub accessory included in a response to the request.

The camera controller 112 can determine whether or not a sub accessory is attached to the lens 102 and whether it is necessary to update the firmware of the lens 102, based on the status information acquired from the lens 102. If it is determined that a sub accessory is (the zoom adapter 103) is attached to the lens 102, the camera controller 112 acquires the operation status and the characteristic information (identification information or the like) of the zoom adapter 103. Specifically, the camera controller 112 transmits an instruction to acquire the information regarding the zoom adapter 103 to the lens controller 119. If the camera controller 112 determines that the zoom adapter 103 is operating in the safe mode, based on the acquired operation status, the camera controller 112 can notify the user of the operation failure of the zoom adapter 103 by, for example, displaying a message on the display circuit 118.

Note that the information request instruction may specify information that is requested. Therefore, the camera controller 112 can request and acquire only the characteristic information, only the status information, or only particular information included in the characteristic information or the status information.

Upon receiving data from the camera controller 112 via the mount IF 124, the lens controller 119 determines whether or not the received data is required to be forwarded to the adapter controller 121, based on, for example, the destination of the data. The lens controller 119 forwards the received data that has been determined as data to be forwarded to the adapter controller 121, to the adapter controller 121 via the adapter IF 125.

Also, upon receiving data from the adapter controller 121 via the adapter IF 125, the lens controller 119 determines whether or not the received data is required to be forwarded to the camera controller 112, based on, for example, the destination of the data. The lens controller 119 forwards the received data that has been determined as data to be forwarded to the camera controller 112, to the camera controller 112 via the mount IF 124.

Therefore, the lens controller 119 forwards the information request instruction regarding the zoom adapter 103, received from the camera controller 112, to the adapter controller 121 via the adapter IF 125. The adapter controller 121 reads out information from the memory circuit 127 in response to the information request instruction, and transmits the information as data addressed to the camera controller 112, to the lens controller 119 via the adapter IF 125. Then, the lens controller 119 forwards the data received from the adapter controller 121, to the camera controller 112 via the mount IF 124.

The camera controller 112 determines whether or not an applicable data file for a firmware update is present in the recording medium 114, based on the information regarding the accessory (the lens 102) and the sub accessory (the zoom adapter 103) thus required.

Figure 3B:
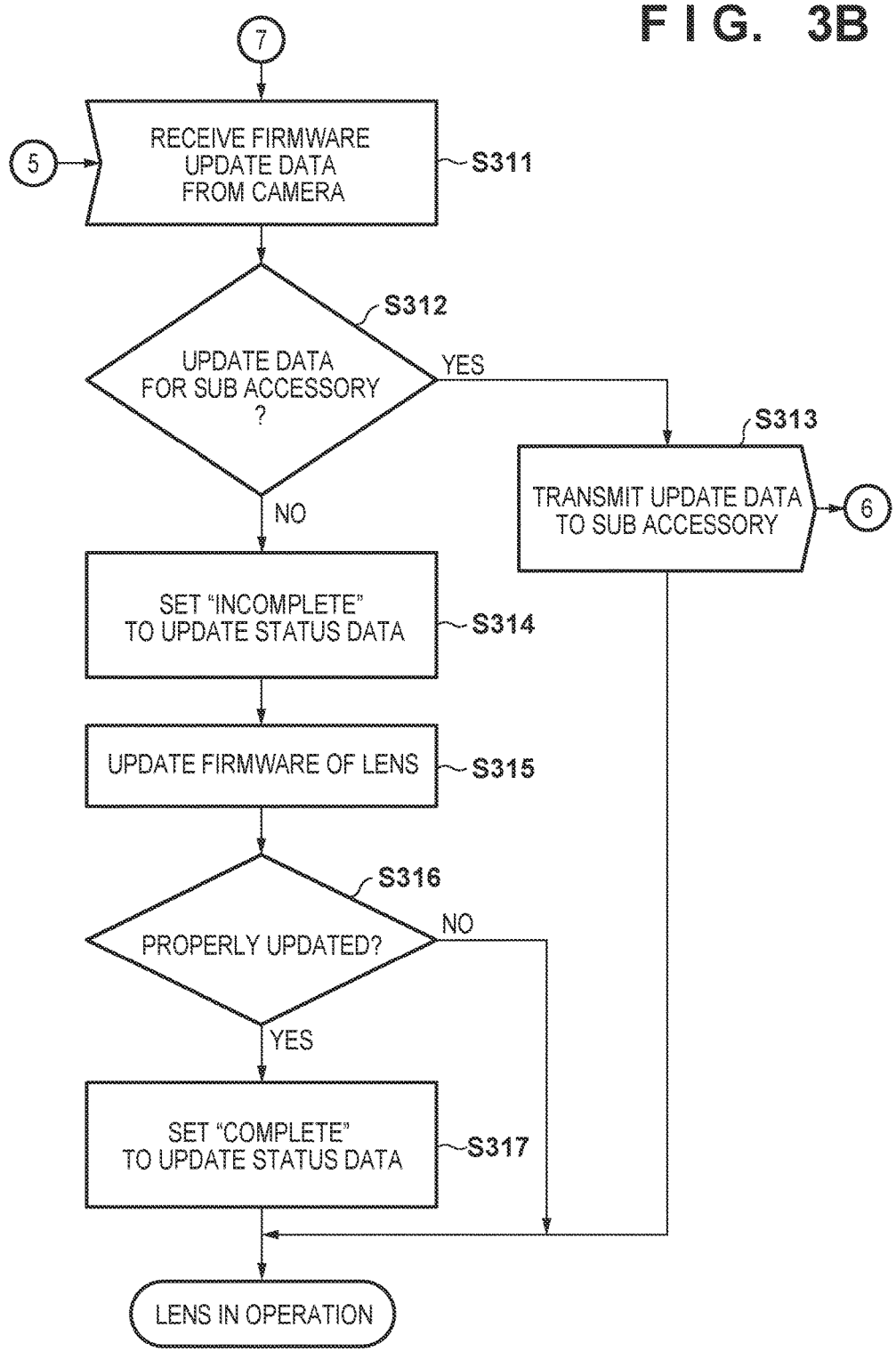
Figure 4:
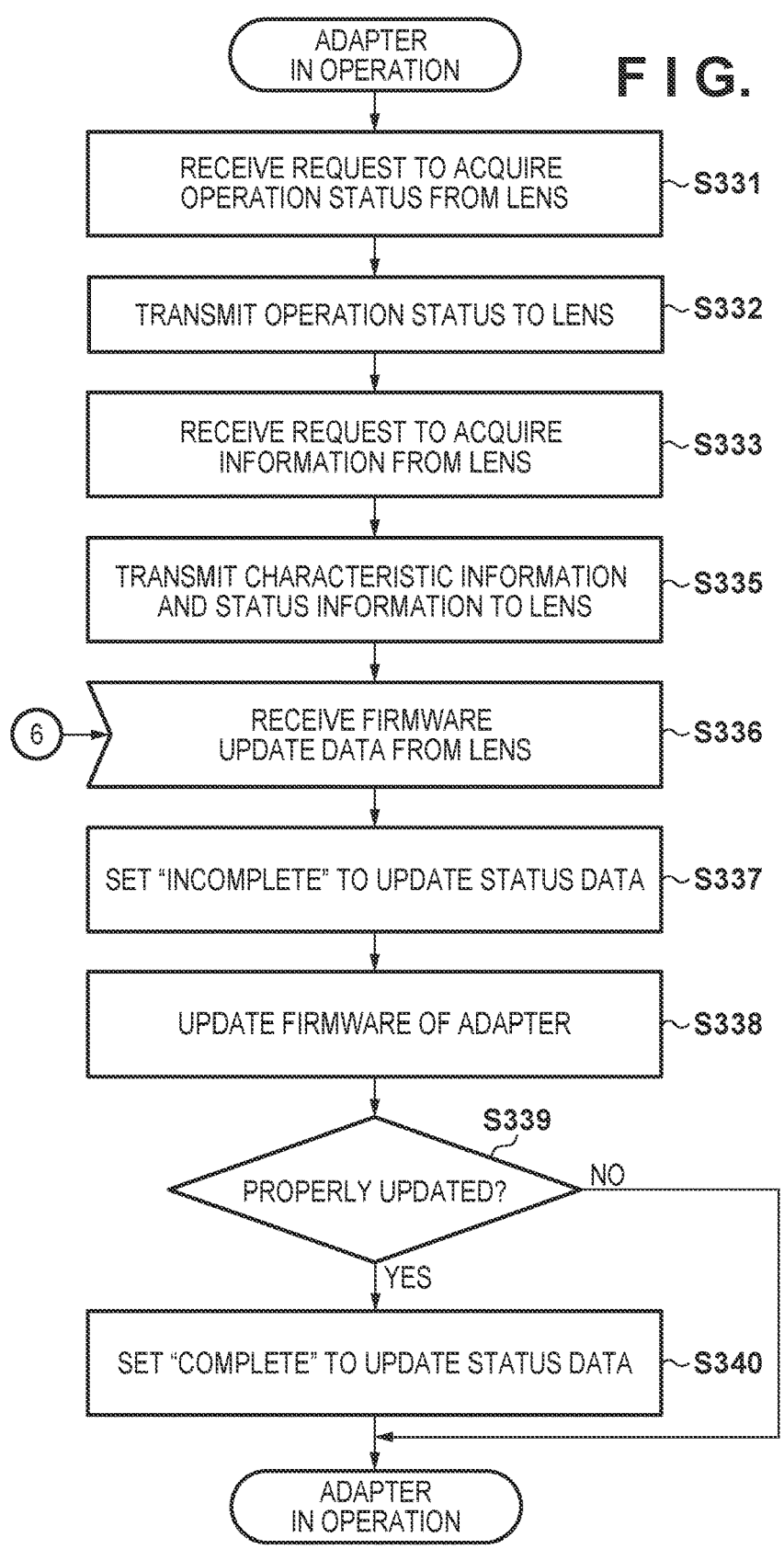
FIG. 4 is a flowchart of an operation of a zoom adapter according to the first embodiment.

Next, the operations of the camera controller 112, the lens controller 119, and the adapter controller 121 regarding the update of the firmware of the accessory and the sub accessory will be described with reference to flowcharts shown in FIGS. 2 to 4. FIG. 2 shows the operation of the camera controller 112, FIGS. 3A and 3B show the operation of the lens controller 119, and FIG. 4 shows the operation of the adapter controller 121. In FIGS. 2 to 4, for the sake of simplification, the camera controller 112, the lens controller 119, and the adapter controller 121 are respectively denoted as "camera", "lens", and "sub accessory".

First, the operation of the camera 101 will be described with reference to FIG. 2. The operation shown in FIG. 2 may be, for example, performed upon detection of a firmware update instruction input from a menu screen by operating the operation circuit 131 while the camera 101 is operating.

In step S201, the camera controller 112 transmits a request to acquire the status information (or the operation status included in the status information), to the lens controller 119 via the mount IF 124. It is only required that whether or not the lens 102 is properly operating can be determined. Therefore, the camera controller 112 may request the entirety of the status information regarding the lens 102 or the operation status included in the status information.

In step S202, the camera controller 112 receives information indicating the operation status, from the lens controller 119 via the mount IF 124. The information indicating the operation status received at this time includes information indicating the normal status or information indicating the safe mode. In the present embodiment, the information indicating the normal status means that both the operation status of the lens 102 and the operation status of the sub accessory (the zoom adapter 103 in this example) attached to the lens 102 are normal. On the other hand, the information indicating the safe mode includes information that specifies which accessory, out of the lens and the sub accessory, is in the safe mode. Note that the operation status may indicate an abnormality other than the safe mode.

In the present embodiment, if a plurality of accessories out of the lens and the sub accessory are in the safe mode, the lens controller 119 determines an accessory whose firmware should be updated at top priority (an update target). Then, the lens controller 119 returns information indicating that the accessory that is the update target is in the safe mode, as the operation status. Therefore, even if a plurality of accessories out of the lens and the sub accessory are in the safe mode, the camera controller 112 receives, in step S202, information indicating that one of the accessories that has been determined by the lens controller 119 is in the safe mode. Then, after the accessory whose firmware should be updated at top priority has been brought into a normal state by the firmware update, the camera controller 112, when step S202 is executed again, receives information indicating that another accessory is in the safe mode.

In step S203, the camera controller 112 determines whether the lens 102 and the sub accessory are both in the normal state, or in a state where a firmware update is required (the safe mode in this example), based on the information indicating the operation status, received in step S202. If it is determined that both the lens 102 and the sub accessory are in a normal state, the camera controller 112 proceeds to step S204. Also, if it is determined that there is an accessory that requires a firmware update, the camera controller 112 determines the firmware update target in step S208. The firmware update target determined in this step is the accessory notified as being in the safe mode by the information received in step S202. The camera controller 112 also displays a screen 601 shown in FIG. 5A or a screen 602 shown in FIG. 5B, and updates the firmware of the lens 102 or the sub accessory, or requests the user to attach another accessory. For example, upon an OK button 603 on the screen 601 or 602 being operated, the camera controller 112 proceeds to step S209.

Note that, if it is determined in step S203 that an accessory (the lens or the sub accessory) is in an operational abnormal state where a firmware update is not required, the camera controller 112 may request the user to eliminate the abnormality, via the display circuit 118. For example, if the zoom adapter 103 attached to the lens 102 cannot properly operate due to a decrease in the power supply voltage, the camera controller 112 displays, for example, a message prompting the user to replace the battery, on the display circuit 118, and then proceeds to step S204.

In step S204, the camera controller 112 transmits a request to acquire accessory information to the lens controller 119 via the mount IF 124, and, in step S205, receives the accessory information from the lens controller 119 via the mount IF 124. Here, target accessories of the information acquisition request may include both the lens and the sub accessory.

FIG. 6A is a diagram showing an example of accessory information 600 that is transmitted to the camera controller 112 by the lens controller 119. The accessory information 600 includes a list of accessories that can be attached to the lens 102, an attachment status (attached/not attached) of each of the accessories, and version information regarding the firmware of each of the attached accessories. Note that information included in the accessory information is not limited to the examples above, and other kinds of information such as an operation status may be included.

In step S206, the camera controller 112 displays a selection screen 700 for selecting a firmware update target, such as the screen shown in FIG. 6B, on the display circuit 118 via the display control circuit 120. The camera controller 112 displays the selection screen 700 that includes the camera 101 and the attached accessories (the lens 102 and sub accessories for which the attachment status in the accessory information 600 is "attached") as options. Note that accessories included in the selection screen 700 are accessories whose operation status is normal.

In step S207, the camera controller 112 accepts selection of the firmware update target through an operation on the selection screen 700 via the operation circuit 131, and proceeds to step S209.

In step S209, the camera controller 112 reads out a firmware update file that is applicable to the update target device, from the recording medium 114 to the buffer memory 111 via the media IF 113. The camera controller 112 refers to, for example, attribute information written in the firmware update file recorded on the recording medium 114. Then, the camera controller 112 can specify, as a firmware update file that is applicable to the update target device, a firmware update file in which the attribute information includes product identification information that matches product identification information regarding the update target device.

In step S210, the camera controller 112 transmits firmware update data included in the firmware update file read out to the buffer memory 111, to the lens controller 119 via the mount IF 124.

Next, the operation of the lens controller 119 will be described with reference to FIGS. 3A and 3B.

In step S301, the lens controller 119 receives, via the mount IF 124, the request to acquire the operation status, transmitted in step S201 by the camera controller 112.

In step S302, the lens controller 119 determines whether or not the operation status of the lens 102 is the normal status. If it is determined that the operation status is the normal status, the lens controller 119 proceeds to step S303, and otherwise, the lens controller 119 proceeds to step S309. The lens controller 119 can determine the operation status of the lens 102 by, for example, referring to the status information stored in the memory circuit 126.

In step S309, the lens controller 119 transmits information indicating the operation status of the lens 102 to the camera controller 112 without checking the operation status of the sub accessory, and proceeds to step S311. The information indicating the operation status transmitted at this time is information indicating that the lens 102 is in the safe mode. In this way, in the present embodiment, the program for the accessory in the safe mode is not required to have the function of acquiring the operation status of the attached sub accessory. If it is possible to notify an abnormality other than the safe mode, information that includes: information indicating that the lens 102 is in an abnormal state; and the details of the abnormality (e.g. a code specifying the abnormality out of a plurality of abnormalities including the safe mode), may be transmitted.

In step S303, the lens controller 119 acquires information indicating the operation status of the attached sub accessory (the zoom adapter 103 in this example). The lens controller 119 acquires information indicating the operation status of the zoom adapter 103 from the adapter controller 121 by, for example, transmitting a request to acquire the operation status, to the adapter controller 121 via the adapter IF 125. Note that if a plurality of sub accessories are attached, the lens controller 119 acquires the operation status of each sub accessory.

In step S304, the lens controller 119 determines whether or not the operation statuses of all of the attached sub accessories are normal based on information indicating the status information acquired in step S303. The lens controller 119 proceeds to step S310 if there is a sub accessory in the safe mode, and otherwise, proceeds to step S305.

In step S310, the lens controller 119 transmits information indicating an operation status indicating that the attached sub accessory is in the safe mode, to the camera controller 112 via the mount IF 124. Here, if a plurality of sub accessories are attached to the lens and a plurality of sub accessories are in the safe mode, the lens controller 119 may determine a sub accessory whose firmware should be updated at top priority and notify the operation status. If it is possible to notify an abnormality other than the safe mode, information that includes identification information regarding a sub accessory that has been determined as being abnormal, and the details of the abnormality (e.g. a code specifying the abnormality out of a plurality of abnormalities including the safe mode) may be transmitted.

In step S305, the lens controller 119 transmits an operation status indicating that the lens 102 and all of the attached sub accessories are normal, to the camera controller 112 via the mount IF 124.

In step S306, the lens controller 119 receives the request to acquire the accessory information, from the camera controller 112 via the mount IF 124. This request is the request transmitted by the camera controller 112 in step S204.

In step S307, the lens controller 119 acquires information from the sub accessory. The lens controller 119 acquires the characteristic information and the status information regarding the zoom adapter 103 from the adapter controller 121 by transmitting an information acquisition request to the adapter controller 121 via the adapter IF 125. Note that if a plurality of sub accessories are attached, the lens controller 119 acquires the characteristic information and the status information regarding each sub accessory.

In step S308, the lens controller 119 generates the above-described accessory information 600 from the information regarding the sub accessory acquired in step S307 and the information regarding the lens 102 (the characteristic information and the status information) stored in the memory circuit 126. Then, the lens controller 119 transmits the accessory information 600 to the camera controller 112 via the mount IF 124.

In step S311, the lens controller 119 receives the firmware update data from the camera controller 112 via the mount IF 124. This data is the data transmitted by the camera controller 112 in step S210.

In step S312, the lens controller 119 determines whether or not the received firmware update data is data for the sub accessory. If it is determined that the data is for the sub accessory, the lens controller 119 proceeds to step S313, and otherwise, proceeds to step S314. This determination can be performed by referring to the attribute information in the firmware update data, and determining whether or not a product identifier written in the attribute information matches the product identifier of the lens 102.

In step S313, the lens controller 119 transmits (forwards) the received firmware update data to the target sub accessory, and terminates the processing.

In step S314, the lens controller 119 sets a value indicating "incomplete" to the data indicating the status of firmware update processing (the update status data) stored in the memory circuit 126, and proceeds to step S315.

In step S315, the lens controller 119 updates the firmware data stored in the memory circuit 126 of the lens 102 by using the received firmware data, and proceeds to step S316.

In step S316, the lens controller 119 determines whether or not the firmware has been properly updated. For example, the lens controller 119 can determine that the firmware has not been properly updated if any of the following conditions is satisfied, and determine that the firmware has been properly updated if none of the conditions is satisfied.

The received firmware data includes an abnormality that cannot be corrected.

An abnormality occurs in communication with the camera controller 112 during a period from the start of reception of the firmware data to the completion of firmware update.

An abnormality occurs in communication with the camera controller 112 that is performed upon completion of the firmware update.

Note that these conditions are examples, and other conditions may be used for determination.

If it is determined that the firmware has been properly updated, the lens controller 119 proceeds to step S317, and otherwise, terminates the processing.

In step S317, the lens controller 119 sets a value indicating "complete" to the update status data in the memory circuit 126, and terminates the processing.

Next, the operation of the adapter controller 121 will be described with reference to FIG. 4.

In step S331, the adapter controller 121 receives, via the adapter IF 125, the request to acquire the operation status, transmitted in step S303 by the lens controller 119.

In step S332, the adapter controller 121 reads out the operation status of the zoom adapter 103 from the status information stored in the memory circuit 127, and transmits the operation status to the lens controller 119.

In step S333, the adapter controller 121 receives, via the adapter IF 125, the information acquisition request transmitted in step S307 by the lens controller 119.

In step S335, the adapter controller 121 reads out the characteristic information and the status information stored in the memory circuit 127, and transmits them to the lens controller 119.

In step S336, the adapter controller 121 receives the firmware update data from the lens controller 119 via the adapter IF 125. This data is the data transmitted by the camera controller 112 in step S210 and forwarded by the lens controller 119 in step S313.

In step S337, the adapter controller 121 sets a value indicating "incomplete" to the data indicating the status of firmware update processing (the update status data) stored in the memory circuit 127, and proceeds to step S338.

In step S338, the adapter controller 121 updates the firmware data stored in the memory circuit 127 by using the received firmware data, and proceeds to step S339.

In step S339, the adapter controller 121 determines whether or not the firmware has been properly updated. For example, the adapter controller 121 can determine that the firmware has not been properly updated if any of the following conditions is satisfied, and can determine that the firmware has been properly updated if none of the conditions is satisfied.

The received firmware data includes an abnormality that cannot be corrected.

An abnormality occurs in communication with the lens controller 119 during a period from the start of reception of the firmware data to the completion of firmware update.

An abnormality occurs in communication with the lens controller 119 that is performed upon completion of the firmware update.

Note that these conditions are examples, and other conditions may be used for determination.

If it is determined that the firmware has been properly updated, the adapter controller 121 proceeds to step S340, and otherwise, terminates the processing.

In step S340, the adapter controller 121 sets a value indicating "complete" to the update status data in the memory circuit 127, and terminates the processing.

According to the present embodiment, in the case of updating the firmware of an accessory that can be attached to a camera, such as a lens unit, and the firmware of a sub accessory that can be attached to the accessory, the firmware of the accessory is updated as an update target at higher priority. Particularly, in the present embodiment, the update target firmware is determined by the accessory, and if the accessory itself is in the safe mode, the accessory notifies the camera of the fact that the firmware of the accessory is the update target firmware at higher priority. Therefore, the camera cannot select the sub accessory as the firmware update target before the operation status of the accessory becomes normal.

In the present embodiment, the firmware of a sub accessory that communicates with the camera via an accessory is updated via an accessory whose operation status is normal. Consequently, it is possible to reliably avoid an abnormal state that may occur when the firmware of a sub accessory is updated via an accessory whose operation status is abnormal.

Also, according to the present embodiment, if an accessory or a sub accessory that is required to be subjected to update processing is attached, they are automatically determined as the update targets. Therefore, even if there is an accessory or a sub accessory that is in an abnormal state, it is possible to swiftly restore their operations.

According to the present embodiment, in addition to the above-described effects, when an accessory is in the safe mode, the firmware of the accessory is updated without checking the operation status of a sub accessory. Therefore, it is possible to reduce the amount of communication activity performed by the accessory in the safe mode in which operations are limited.

SECOND EMBODIMENT

Next, a second embodiment of the present invention will be described. The first embodiment is configured such that, if the lens 102 is determined as being in an abnormal state such as the safe mode, the operation status of the lens 102 is transmitted to the camera 101 without detecting the operation status of the sub accessory (the zoom adapter 103) attached to the lens 102. In this case, the update target firmware is determined by the lens 102. In contrast, in the present embodiment, even if the lens 102 is in an abnormal state, the operation status of the sub accessory (the zoom adapter 103) is detected and transmitted to the camera 101, and the camera 101 determines the firmware update target. Therefore, according to the present embodiment, the function of acquiring the operation status of the attached sub accessory is included in the program for the safe mode.

Figure 7:
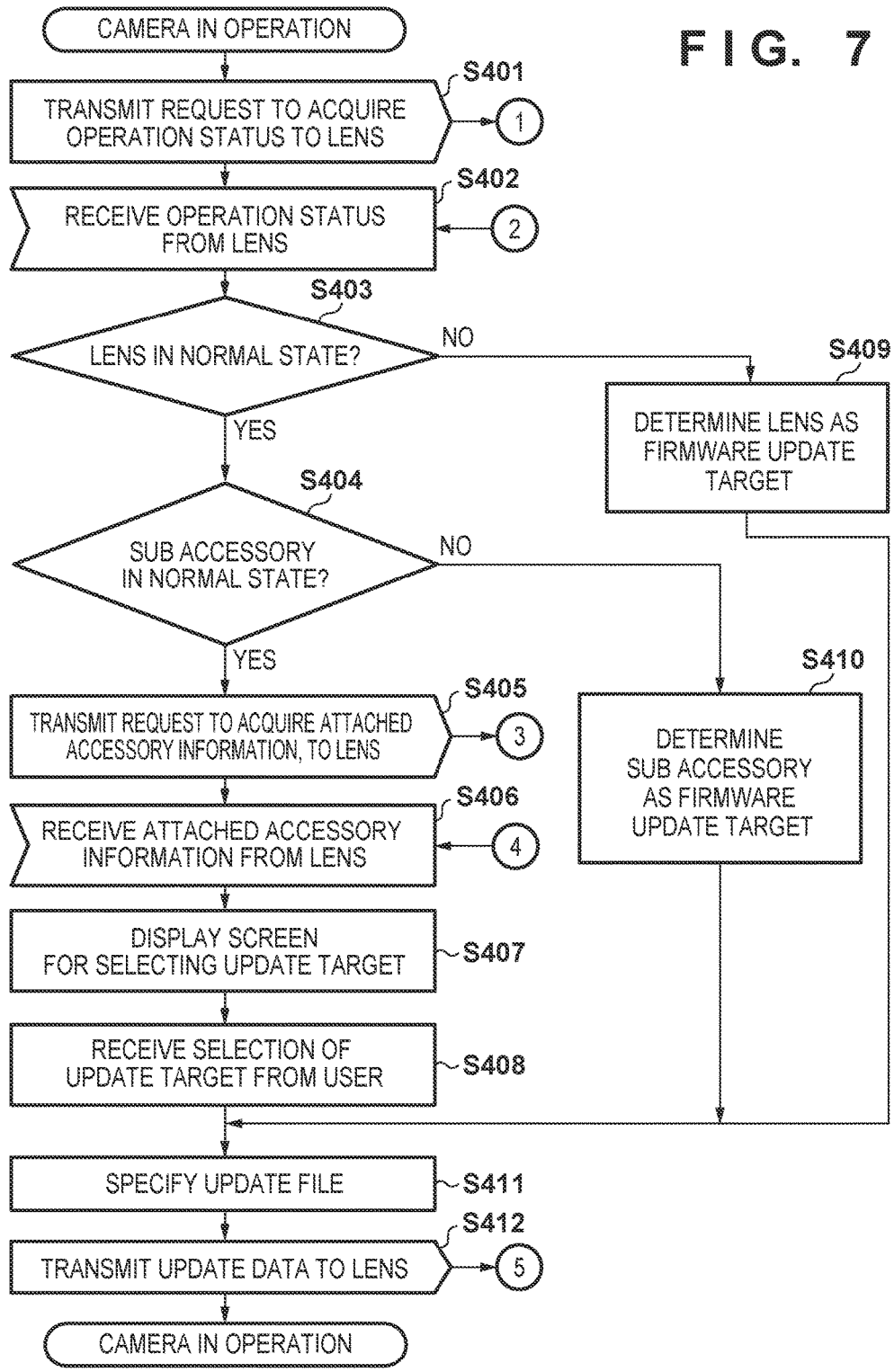
FIG. 7 is a flowchart of an operation of a digital camera according to a second embodiment.
Figure 8:
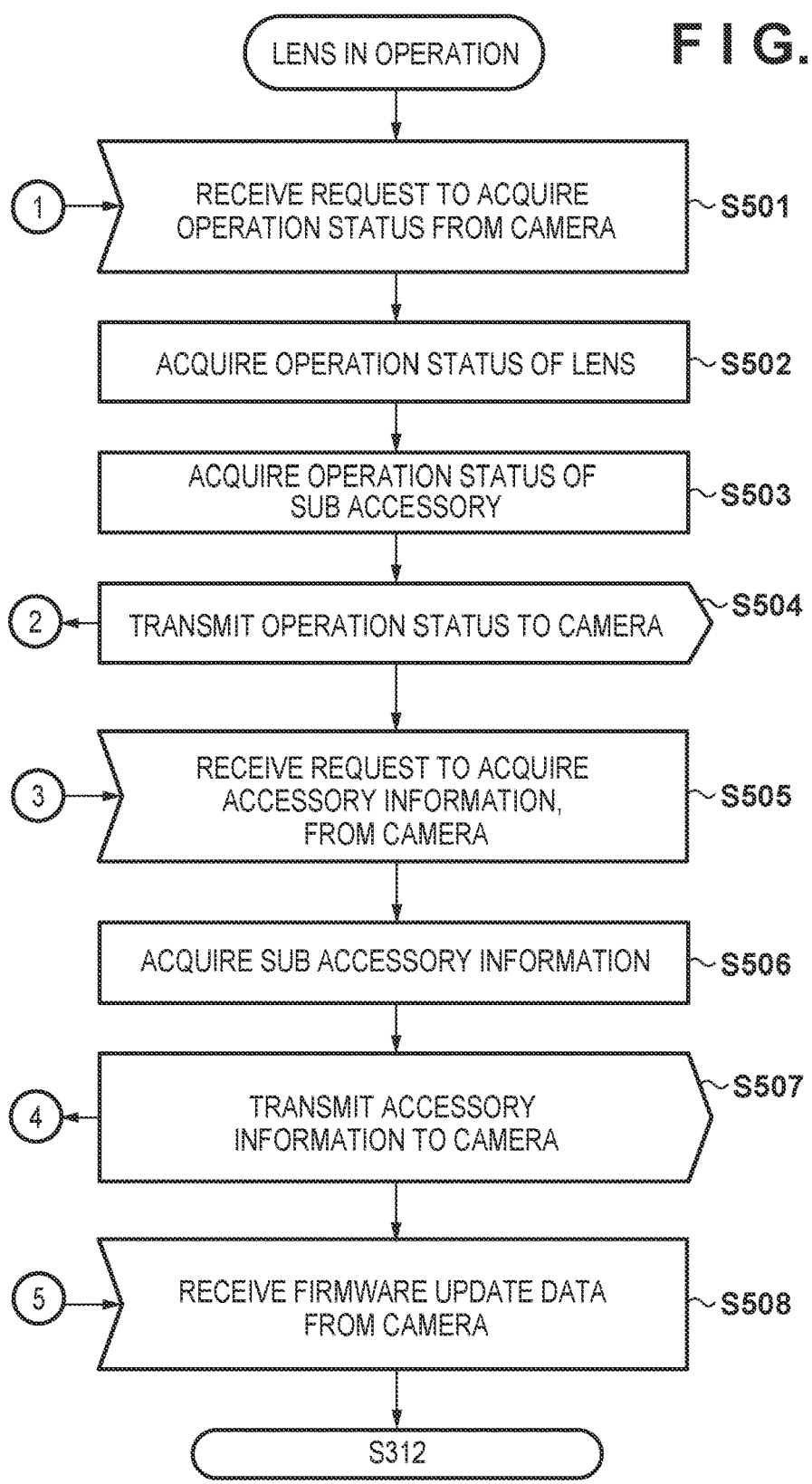
FIG. 8 is a flowchart of an operation of a lens unit according to the second embodiment.

The configurations of the camera 101, the lens 102, and the zoom adapter 103, and the operations of the camera 101 and the zoom adapter 103 are the same as those in the first embodiment, and therefore descriptions thereof are omitted. Next, the operations of the camera controller 112 and the lens controller 119 regarding the update of the firmware of the accessory and the sub accessory will be described with reference to flowcharts shown in FIGS. 7 and 8. FIG. 7 shows the operation of the camera controller 112, and FIG. 8 shows the operation of the lens controller 119. Note that the operation of the adapter controller 121 is the same as that shown in FIG. 4, and therefore a detailed description thereof is omitted.

First, the operation of the camera 101 will be described with reference to FIG. 7. The operation shown in FIG. 7 may be, for example, performed upon detection of a firmware update instruction input from a menu screen by operating the operation circuit 131 while the camera 101 is operating.

In step S401, the camera controller 112 transmits a request to acquire the status information (or the operation status included in the status information), to the lens controller 119 via the mount IF 124. It is only required that whether or not the lens 102 is properly operating can be determined. Therefore, the camera controller 112 may request the entirety of the status information regarding the lens 102 or the operation status included in the status information.

In step S402, the camera controller 112 receives information indicating the operation status, from the lens controller 119 via the mount IF 124. The information indicating the operation status received at this time includes information indicating the normal status or information indicating the safe mode. The information indicating the normal status means that both the operation status of the lens 102 and the operation status of the sub accessory (the zoom adapter 103 in this example) attached to the lens 102 are normal. On the other hand, the information indicating the safe mode includes information that specifies which accessory, out of the lens and the sub accessory, is in the safe mode. In the present embodiment, information that identifies all of the accessories that are in the safe mode out of the lens and sub accessories is transmitted from the lens controller 119. For example, in the present embodiment, the information indicating the operation status may include the operation status of the lens 102 and the operation status of the sub accessory separately. Also, the information indicating the operation status may be identification information regarding an accessory that is in the safe mode, out of the lens 102 and the sub accessory, or information indicating that all of the accessories are normal. Also, the operation status may indicate an abnormality other than the safe mode.

In step S403, the camera controller 112 first determines whether the lens 102 is in the normal state, or in a state where a firmware update is required (the safe mode in this example), based on the information indicating the operation status, received in step S402. If it is determined that the lens 102 is in a normal state, the camera controller 112 proceeds to step S404. If it is determined that the lens 102 is in a state where a firmware update is required, the camera controller 112 determines the lens 102 as the firmware update target in step S409. The camera controller 112 also displays the screen 601 shown in FIG. 5A, and requests the user to update the firmware of the lens 102 or to attach another lens. For example, upon the OK button 603 on the screen 601 being operated, the camera controller 112 proceeds to step S411. Note that, if it is determined in step S403 that the lens is in an operational abnormal state where a firmware update is not required, the camera controller 112 may request the user to eliminate the abnormality via the display circuit 118.

In step S404, the camera controller 112 determines whether the sub accessory (the zoom adapter 103) is in a normal state or in a state where a firmware update is required (the safe mode), based on the operation status received in step S402. If it is determined that the zoom adapter 103 is in a normal state, the camera controller 112 proceeds to step S405. If it is determined that the zoom adapter 103 is in a state where a firmware update is required, the camera controller 112 determines the zoom adapter 103 as the firmware update target in step S410. The camera controller 112 also displays the screen 602 shown in FIG. 5B, and requests the user to update the firmware of the zoom adapter 103 or to attach another zoom adapter. For example, upon the OK button 603 on the screen 602 being operated, the camera controller 112 proceeds to step S411.

In step S405, the camera controller 112 transmits a request to acquire accessory information to the lens controller 119 via the mount IF 124, and, in step S406, receives the accessory information from the lens controller 119 via the mount IF 124. Processing performed in steps S405 to S408 is the same as the processing performed in steps S204 to S207 shown in FIG. 2, and processing performed in steps S411 and S412 may be the same as the processing performed in steps S209 and S210 shown in FIG. 2, and therefore detailed descriptions thereof are omitted.

Next, the operation of the lens controller 119 will be described with reference to FIG. 8.

In step S501, the lens controller 119 receives, via the mount IF 124, the request to acquire the operation status, transmitted in step S401 by the camera controller 112.

In step S502, the lens controller 119 acquires the operation status of the lens 102 from the status information stored in the memory circuit 126, and stores the operation status in the buffer memory 111, for example.

In step S503, the lens controller 119 acquires the operation status of the attached sub accessory. The lens controller 119 acquires the operation status of the zoom adapter 103 from the adapter controller 121 by, for example, transmitting a request to acquire the operation status, to the adapter controller 121 via the adapter IF 125. Note that if a plurality of sub accessories are attached, the lens controller 119 acquires the operation status of each sub accessory.

In step S504, the lens controller 119 transmits information indicating the operation status of the lens 102 acquired in step S502 and the operation status of the sub accessory acquired in step S503 to the camera controller 112 via the mount IF 124.

In step S505, the lens controller 119 receives, via the mount IF 124, the request to acquire the accessory information transmitted in step S405 by the camera controller 112. Upon receiving the request to acquire the accessory information, the lens controller 119 proceeds to step S506.

In step S506, the lens controller 119 acquires information from the sub accessory. The lens controller 119 acquires the characteristic information and the status information regarding the zoom adapter 103 from the adapter controller 121 by transmitting an information acquisition request to the adapter controller 121 via the adapter IF 125. Note that if a plurality of sub accessories are attached, the lens controller 119 acquires the characteristic information and the status information regarding each sub accessory.

In step S507, the lens controller 119 generates the above-described accessory information 600 from the information regarding the sub accessory acquired in step S506 and the information regarding the lens 102 (the characteristic information and the status information) stored in the memory circuit 126. Then, the lens controller 119 transmits the accessory information 600 to the camera controller 112 via the mount IF 124.

In step S508, the lens controller 119 receives the firmware update data from the camera 101 via the mount IF 124. This data is the data transmitted by the camera controller 112 in step S412. Upon receiving the firmware update data, the lens controller 119 performs step S312 and the subsequent steps shown in FIG. 3B.

As described above, in the present embodiment, the camera determines an accessory whose firmware should be updated at top priority, and the firmware of the accessory is updated as an update target at top priority. With the present embodiment, it is possible to achieve the same effect as with the first embodiment, and also the camera can acquire the operation status of the sub accessory even if the accessory is in an abnormal state. Therefore, for example, if there is a sub accessory that requires a firmware update, it is possible to update the firmware of the sub accessory immediately after the firmware of the accessory has been updated.

While exemplary embodiments of the present invention have been described above, the present invention is not limited to the specific configurations disclosed in the embodiments. Various modifications and variations included in the scope defined by the claims are also included in the present invention.

OTHER EMBODIMENTS

Although the above-described embodiments describe cases in which the accessory is a lens unit, the present invention is also applicable to a case in which the accessory is an extender, in the same manner. Specifically, in the above-described embodiments, the lens unit may be replaced with an extender, and the lens unit may be regarded as a sub accessory. Also, the accessory is not limited to the extender or the lens unit, and may be a flash or the like.

It is also possible to employ a configuration in which, if a plurality of accessories are attached, the firmware of a sub accessory attached to any of the accessories cannot be updated before the firmware of all of the accessories has been properly updated.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-027245, filed on Feb. 16, 2016, which is hereby incorporated by reference herein in its entirety.

What is claimed is:

1. An image capture apparatus comprising:
    a receiving unit configured to receive information regarding a first accessory attached to the image capture apparatus and a second accessory attached to the first accessory, from the first accessory;
    a setting unit configured to set an update target accessory whose control software is to be updated, out of the first accessory and the second accessory, based on the information received by the receiving unit; and
    a transmitting unit configured to transmit update data that is to be applied to the update target accessory that has been set by the setting unit, to the first accessory,
    wherein the setting unit sets the first accessory as the update target accessory if the information received by the receiving unit indicates that an update of control software of the first accessory is in an interrupted state, regardless of whether or not an update of control software of the second accessory is in an interrupted state.

2. The image capture apparatus according to claim 1,
    wherein the setting unit sets the second accessory as the update target if the information received by the receiving unit indicates that the update of the control software of the first accessory is not in an interrupted state and the update of the control software of the second accessory is in an interrupted state, and
    wherein the transmitting unit transmits update data that is to be applied to the second accessory, to the second accessory via the first accessory.

3. The image capture apparatus according to claim 1,
    wherein the setting unit sets the first accessory as the update target accessory if the information received by the receiving unit indicates that the update of the control software is in an interrupted state for each of the first accessory and the second accessory, and sets the second accessory as the update target accessory after completion of the update of the control software of the first accessory has been confirmed.

4. The image capture apparatus according to claim 1,
    wherein the receiving unit does not receive information indicating whether or not the update of the control software of the second accessory is in an interrupted state if the received information indicates that the update of the control software of the first accessory is in an interrupted state.

5. The image capture apparatus according to claim 1, further comprising:
an accepting unit configured to accept selection, by a user, of an accessory as the update target accessory,
wherein the setting unit sets the accessory selected by the user, out of the first accessory and the second accessory, as the update target accessory if the information received by the receiving unit indicates that each of the update of the control software of the first accessory and the update of the control software of the second accessory is not in an interrupted state.

6. The image capture apparatus according to claim 1, wherein the first accessory includes at least one of a lens unit, an extender, and a flash.

7. The image capture apparatus according to claim 1, wherein the first accessory is a lens unit with a zoom mechanism, and the second accessory is an adapter configured to mechanically drive the zoom mechanism from outside of the lens unit.

8. An accessory for an image capture apparatus, comprising:
a first communication unit configured to transmit an instruction that requests information regarding a sub accessory attached to the accessory, to the sub accessory, and to receive the information;
a second communication unit configured to transmit information regarding the accessory and the information regarding the sub accessory to an image capture apparatus to which the accessory is attached, in response to an instruction received from the image capture apparatus and requesting information, and to receive update data that is to be applied to an update target accessory whose control software is to be updated, out of the accessory and the sub accessory, from the image capture apparatus;
a storage unit configured to store control software of the accessory; and
a control unit configured to, if an update of the control software of the accessory is in an interrupted state, transmit information indicating that the update of the control software of the accessory is in an interrupted state to the image capture apparatus, and receive update data from the image capture apparatus, by using the second communication unit, and update the control software stored in the storage unit, and receive information indicating whether or not an update of control software of the sub accessory is in an interrupted state, from the sub accessory, by using the first communication unit, and transmit the received information to the image capture apparatus by using the second communication unit.

9. The accessory according to claim 8, wherein the second communication unit does not transmit the received information indicating whether or not the update of the control software of the sub accessory is in an interrupted state if the update of the control software of the accessory is in an interrupted state.

10. The accessory according to claim 9, wherein the first communication unit does not receive the information indicating whether or not the update of the control software of the sub accessory is in an interrupted state if the update of the control software of the accessory is in an interrupted state.

11. The accessory according to claim 8, wherein the control unit receives, if the update of the control software of the accessory is not in an interrupted state, the information indicating whether or not the update of the control software of the sub accessory is in an interrupted state, from the sub accessory, by using the first communication unit, transmits the received information to the image capture apparatus and receive update data from the image capture apparatus, by using the second communication unit, and transmits the update data to the sub accessory by using the first communication unit.

12. The accessory according to claim 8, wherein the control unit receives, if the update of the control software of the accessory is not in an interrupted state and the update of the control software of the sub accessory is in an interrupted state, the information indicating whether or not the update of the control software of the sub accessory is in an interrupted state, from the sub accessary, by using the first communication unit, transmits the received information to the image capture apparatus and receive update data from the image capture apparatus, by using the second communication unit, and transmits the update data to the sub accessory by using the first communication unit.

13. An accessory for an image capture apparatus, comprising:
a first receiving unit configured to receive information regarding a sub accessory attached to the accessory;
a storage unit configured to store control software of the accessory;
a determining unit configured to determine an update target accessory whose control software is to be updated, out of the accessory and the sub accessory;
a transmitting unit configured to transmit a notification indicating information regarding the update target accessory, to the image capture apparatus to which the accessory is attached; and
a second receiving unit configured to receive update data that is to be applied to the update target accessory, from the image capture apparatus,
wherein the determining unit determines, if an update of the control software stored in the storage unit is in an interrupted state, the accessory as the update target accessory, regardless of whether or not an update of control software of the sub accessory is in an interrupted state.

14. The accessory according to claim 13, wherein the determining unit determines the sub accessory as the update target accessory if the update of the control software stored in the storage unit is not in an interrupted state.

15. The accessory according to claim 13, wherein the transmitting unit transmits, if the update of the control software stored in the storage unit is in an interrupted state, a notification indicating that the accessory is the update target accessory, without receiving information indicating whether or not the update of the control software of the sub accessory is in an interrupted state by the first receiving unit.

16. The accessory according to claim 13, wherein the first receiving unit receives information indicating whether or not the update of the control software of the sub accessory is in an interrupted state if the control software stored in the storage unit is not in an interrupted state.

17. The accessory according to claim 13, wherein the transmitting unit transmits, to the image capture apparatus, a notification indicating that the sub accessory is the update target accessory, if the control software stored in the storage unit is not in an interrupted state and the update of the control software of the sub accessory is in an interrupted state.

18. An image capture system that includes an image capture apparatus, a first accessory attached to the image capture apparatus, and a second accessory attached to the image capture apparatus, the first accessory comprising:
a first receiving unit configured to receive information regarding the second accessory;
a first transmitting unit configured to transmit information regarding the first accessory and the second accessory to the image capture apparatus; and
a second receiving unit configured to receive update data that is to be applied to an update target accessory whose control software is to be updated, out of the first accessory and the second accessory, from the image capture apparatus, the image capture apparatus comprising:
a third receiving unit configured to receive information regarding the first accessory and the second accessory from the first accessory;
a second transmitting unit configured to transmit the update data that is to be applied to the update target accessory, to the first accessory; and
a setting unit configured to set the first accessory as the update target accessory upon the third receiving unit receiving information indicating that an update of control software of the first accessory is in an interrupted state, regardless of whether or not update of control software of the second accessory is in an interrupted state.

19. A method for controlling an image capture apparatus to which a first accessory is attached, wherein a second accessory is attached to the first accessory, the method comprising:
receiving information regarding the first accessory;
setting an update target accessory whose control software is to be updated, based on the information received in the receiving;
transmitting update data that is to be applied to the update target accessory that has been set, to the first accessory,
wherein, in the setting, the first accessory is set as the update target accessory if information indicating that an update of control software of the first accessory is in an interrupted state is received in the receiving, regardless of whether or not update of control software of the second accessory is in an interrupted state.

20. A method for controlling an accessory for an image capture apparatus, comprising:
receiving information regarding a sub accessory attached to the accessory;
transmitting information regarding the accessory to an image capture apparatus to which the accessory is attached; and
receiving update data that is to be applied to an update target accessory whose control software is to be updated, out of the accessory and the sub accessory, from the image capture apparatus,
determining the accessory as the update target accessory if, in the transmitting, information indicating that an update of control software of the accessory is in an interrupted state is transmitted, regardless of whether or not an update of control software of the sub accessory is in an interrupted state.

* * * * *